(12) United States Patent
Alomair

(10) Patent No.: US 10,243,744 B2
(45) Date of Patent: Mar. 26, 2019

(54) RESIDUE MESSAGE AUTHENTICATION CODE

(71) Applicant: The King Abdulaziz City for Science and Technology, Riyadh (SA)

(72) Inventor: Basel Saleh Alomair, Riyadh (SA)

(73) Assignee: The King Abdulaziz City for Science and Technology, Riyadh (SA)

( * ) Notice: Subject to any disclaimer, the term of this patent is extended or adjusted under 35 U.S.C. 154(b) by 149 days.

(21) Appl. No.: 15/188,921

(22) Filed: Jun. 21, 2016

(65) Prior Publication Data

US 2017/0366354 A1  Dec. 21, 2017

(51) Int. Cl.
*H04L 29/06* (2006.01)
*H04L 9/32* (2006.01)
*H04L 9/06* (2006.01)

(52) U.S. Cl.
CPC .......... *H04L 9/3242* (2013.01); *H04L 9/0643* (2013.01); *H04L 63/123* (2013.01)

(58) Field of Classification Search
CPC .... H04L 9/0643; H04L 9/3242; H04L 63/123
USPC ........................................................ 713/181
See application file for complete search history.

(56) References Cited

U.S. PATENT DOCUMENTS 6,058,215 A * 5/2000 Schwartz ................ G06T 9/007
348/403.1

* cited by examiner

*Primary Examiner* — Anthony D Brown
(74) *Attorney, Agent, or Firm* — Steven M. Shape; Dennemeyer & Associates

(57) ABSTRACT

The invention provides a method and system for generating a message authentication code (MAC) for authenticating a message and for verifying the integrity and authenticity of the message. The method for generating the MAC for authenticating the message includes the step of compressing the message to generate a fixed-size residue of the message. The fixed-size residue of the message is computed from the message modulo a divisor. The method, then, multiplies the fixed-size residue of the message by an authentication key. Thereafter, the method computes an authentication tag for the message by encrypting the fixed-size residue of the message utilizing a semantically secure encryption algorithm. The method, then, transmits both the message and the authentication tag of the message from a sender computing device to a receiver computing device where the method verifies the integrity and authenticity of the message using the authentication key.

14 Claims, 6 Drawing Sheets

RESIDUE MESSAGE AUTHENTICATION CODE

FIELD OF THE INVENTION

The invention generally relates to the field of generating a message authentication code for authenticating a message. More specifically, the invention relates to a method and system for enabling a sender computing device for authenticating a message using the message authentication code and verifying the integrity and authenticity of the message at a receiver computing device.

BACKGROUND OF THE INVENTION

With the intensive use of digital communication, efficient techniques for authenticating messages that are exchanged over insecure channels of communication are a key requirement. Cryptography is a technique used for preserving the integrity of messages transmitted over public and insecure channels of communication. One of the most widely used cryptographic techniques for preserving the integrity and authenticity of messages is a Message Authentication Code (MAC). A MAC is a symmetric key primitive that is used for authenticating a message in an effective manner.

The earliest MAC algorithms for authenticating the message were typically based on block ciphers. In recent years, block ciphers have been replaced by cryptographic hash functions as they are faster and MACs based on iterated hash functions yield faster designs. However, the fastest MACs in the prior art belong to another class of MAC algorithms namely MACs based on universal hash-function families.

However, the universal hash families are not cryptographic functions. That is, using universal hash families may lead to exposure of the secret hashing key if sufficient independent message-image pairs are provided. Also, it is easy to construct a system of linear equations in order to solve for the secret key that is used for authenticating the message. Thus, in order to prevent the exposure of the hashing key, certain techniques in the prior art restricted the use of the same hashing key to a limited number of times, leading to an unconditionally secure MAC. Later, in order to avoid the impracticality of dealing with one-time keys, the hashed image was processed with a cryptographic function in order to secure the hashing key.

In the existing MAC primitives based on universal hashing families, every single bit of the message to be authenticated must be processed with a secret MAC key. For instance, in the case of MACs based on universal hash families, an entire message must be broken into blocks and every single block of the message is to be multiplied with a random secret key that is independent of other keys corresponding to other blocks.

Also, in many universal hashing approaches that were used for generating the MAC, managing long keys introduces bottlenecks during processing of the keys using cryptographic functions.

Therefore, in light of the above mentioned prior art, there is a need for a method and system for generating a more efficient and secure MAC for authenticating a message.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
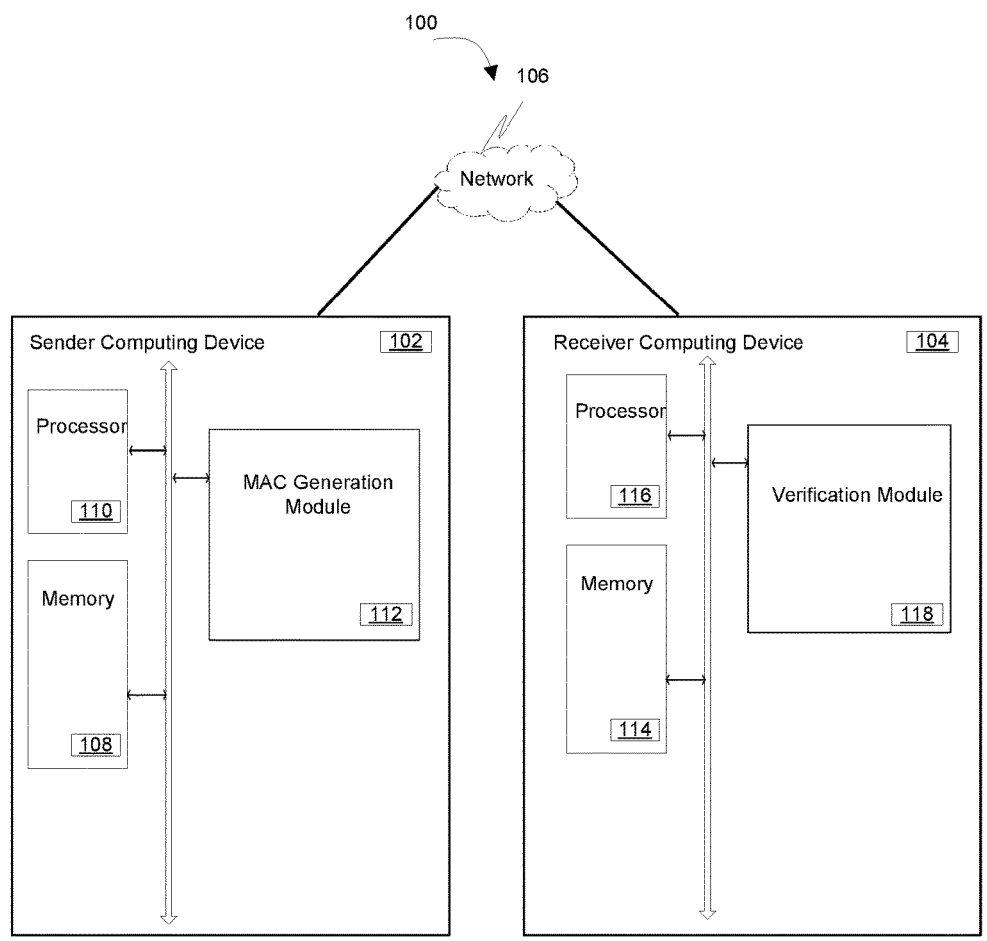
FIG. 1 illustrates a system for generating a message authentication code (MAC) for authenticating a message and for verifying the integrity and authenticity of the message in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and system components related to generating a message authentication code (MAC) for authenticating a message at a sender computing device and for verifying the integrity and authenticity of the message received at a receiver computing device.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a method and system for generating a MAC for authenticating a message at a sender computing device and for verifying the integrity and authenticity of the message at a receiver computing device. The method for generating the MAC for authenticating the message includes the step of compressing the message to generate a fixed-size residue of the message. The fixed-size residue of the message is computed from the message modulo a divisor. The method, then, multiplies the fixed-size residue of the message by an authentication key. Thereafter, the method computes an authentication tag for the message by encrypting the fixed-size residue of the message utilizing a semantically secure encryption algorithm. The method, then, transmits both the message and the authentication tag of the message to the receiver computing device. The receiver computing device has access to the authentication key that was used to generate the MAC at the sender computing device. At the receiver computing device, the method verifies the integrity and authenticity of the message using the authentication key.

FIG. 1 illustrates a system 100 for generating a message authentication code (MAC) for authenticating a message and for verifying the integrity and authenticity of the message in accordance with an embodiment of the invention.

The message can be, but need not be limited to, a short message, an arbitrarily long message with multiple blocks.

As illustrated in FIG. 1, system 100 includes a sender computing device 102 and a receiver computing device 104. Sender computing device 102 and receiver computing device 104 can be for example, but not limited to, a mobile device, a personal digital assistant, a computer, a laptop, a smart phone and a tablet. Sender computing device 102 and receiver computing device 104 communicate with each other over a network 106 such as, but not limited to, near field communication (NFC), wiFi, iBeacon™., internet, intranet, Local Area Network (LAN), Wireless Local Area Network (WLAN), Wireless Wide Area Network (WWAN), Wireless Metropolitan Area Network (WMAN), Wide Area Network (WAN) and telecommunication network.

Sender computing device 102 includes a memory 108 and a processor 110 communicatively coupled to memory 108. Sender computing device 102 further includes a MAC generation module 112 communicatively coupled to both memory 108 and processor 110. MAC generation module 112 generates the MAC for authenticating the message. MAC generation module 112 is further described in detail in conjunction with FIG. 2.

Once the message is authenticated using the MAC that was generated by MAC generation module 112, sender computing device 102 transmits the message to receiver computing device 104.

Receiver computing device 104 includes a memory 114 and a processor 116 communicatively coupled to memory 114. Receiver computing device 114, further, includes a verification module 118 communicatively coupled to both memory 114 and processor 116. Verification module 118 verifies the integrity and authenticity of the message received from sender computing device 102 using the authentication key that was used for generating the MAC at sender computing device 102. Verification module 118 is further described in detail in conjunction with FIG. 3.

Figure 2:
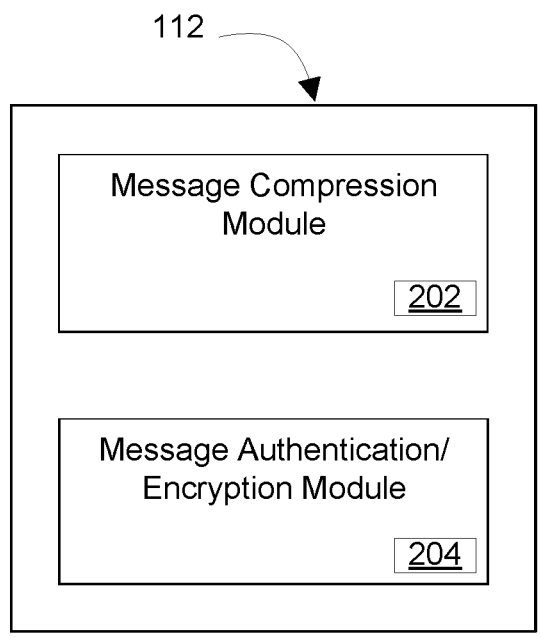
FIG. 2 illustrates a MAC generation module for generating a MAC for authenticating a message at a sender computing device in accordance with an embodiment of the invention.

FIG. 2 illustrates MAC generation module 112 for generating the MAC for authenticating the message in accordance with an embodiment of the invention.

As illustrated in FIG. 2, MAC generation module 112 includes a message compression module 202 and a message authentication/encryption module 204.

Message compression module 202 compresses the message by generating a fixed-size residue of the message. The fixed-size residue of the message is computed from the message modulo a divisor. The divisor can be, but need not be limited to, a prime integer, an irreducible polynomial.

Once the fixed-size residue of the message is generated, message authentication/encryption module 204 multiplies the fixed-size residue of the message by an authentication key. Further, message authentication/encryption module 204 computes an authentication tag for the message by encrypting the fixed-size residue of the message utilizing a semantically secure encryption algorithm. The secure encryption algorithm can be, but need not be limited to, an IND-CPA secure encryption. In some cases, the encryption algorithm that is used is a stream cipher or a block cipher operated in a stream mode, such as the counter mode.

The generation of the MAC for authentication the message using MAC generation module 112 is further described in detail in accordance with various embodiments of the invention.

In accordance with an exemplary embodiment of the invention, MAC generation module 112 utilizes three algorithms for generating the MAC namely a key generation algorithm K, signing algorithm S and verifying algorithm V, where K is a security parameter. The key generation algorithm K does not take any input and returns a pair (p, k), where p determines a prime field under which the MAC is computed and k is the authentication key. The prime p can be drawn uniformly at random from $P_k$, the set of all k-bit primes while the authentication key is drawn uniformly at random from the set of $F_p \setminus \{0, \ldots [p/2]\}$, where k must be greater than p/2.

For instance, if an arbitrarily long message m is received as input to MAC generation module 112, the signing algorithm S of message compression module 202 appends '1' as a most significant bit of the message as $m_{app}=1/m$. Appending the message with a '1' as the most significant bit serves an important purpose as it guarantees that distinct binary messages correspond to distinct integers since padding the most significant part of the message with zeros will force its integer value to change. $m_{app}$ is then reduced to its residue modulo p as follows.

$$m_{res} = m_{app} (\bmod p)$$

Message authentication/encryption module 204, then, computes the authentication tag for the message using the semantically secure encryption algorithm as follows.

$$\tau = \varepsilon(k \cdot m_{res}(\bmod p))$$

where ε is an IND-CPA secure encryption.

In accordance with another exemplary embodiment of the invention, MAC generation module 112 generates the MAC for authenticating the message using binary fields instead of prime integers. A number of irreducible polynomials of degree k over the binary field is given by Gauss's formula as:

$$\frac{1}{K} \sum_{d/K} \mu(K/d) 2^d$$

where, μ(x) is determined as a Mobius function. Therefore, the number of primes less than $2^K$ is similar to the number of irreducible polynomials of degree K over the binary field is exponential in K. Further, the probability of guessing an irreducible polynomial can be selected randomly from the set of all possible irreducible polynomials of degree K, which can be determined to be negligible in K.

Figure 3:
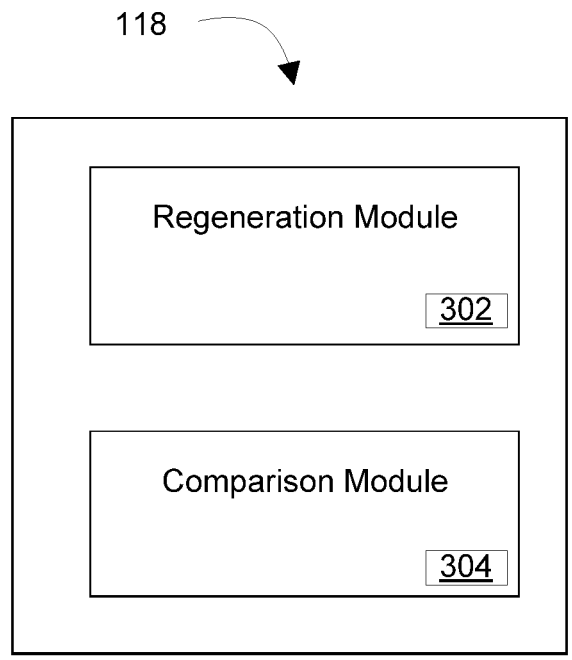
FIG. 3 illustrates a verification module for verifying the integrity and authenticity of a message at a receiver computing device in accordance with an embodiment of the invention.

FIG. 3 illustrates verification module 118 for verifying the integrity and authenticity of the message at receiver computing device 104 in accordance with an embodiment of the invention.

As illustrated in FIG. 3, verification module 118 includes a regeneration module 302 and a comparison module 304.

On receiving the message with the authentication tag at receiver computing device 104, regeneration module 302 regenerates an authentication tag using the authentication key that was used for generating the MAC at sender computing device 102.

Comparison module 304, then, compares the authentication tag regenerated by regeneration module 302 with the authentication tag received from sender computing device 102 for verifying the integrity and authenticity of the message. If the authentication tag that was regenerated by regeneration module 302 matches with the authentication tag transmitted from sender computing device 102, the integrity and authenticity of the message is determined to by verified.

Figure 4:
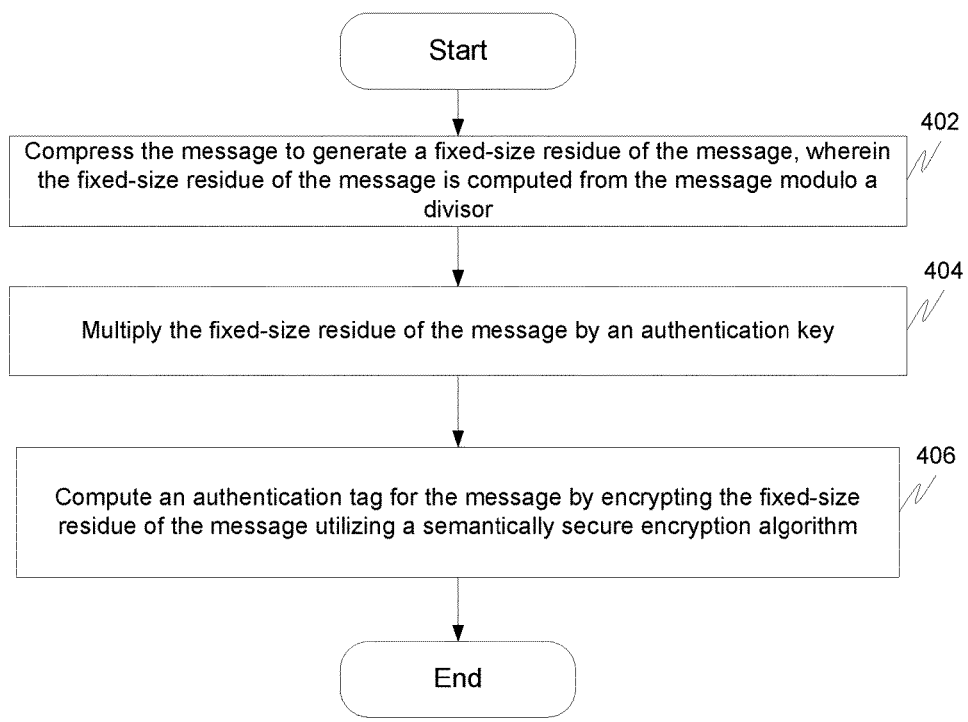
FIG. 4 illustrates a flowchart of a method for generating a MAC for authenticating a message at a sender computing device in accordance with an embodiment of the invention.

FIG. 4 illustrates a flowchart of a method for generating the MAC using MAC generation module 112 for authenticating the message in accordance with an embodiment of the invention.

At step 402, message compression module 202 compresses the message to generate a fixed-size residue of the message. The message is compressed after appending '1' as the most significant bit of the message and the fixed-size residue of the message is then generated by computing the message modulo a divisor. The divisor can be either a prime integer or an irreducible polynomial.

Moving on, at step 404, message authentication/encryption module 204 multiplies the fixed-size residue of the message with an authentication key. Thereafter, at step 308, message authentication/encryption module 204 encrypts the fixed-size residue of the message by utilizing a semantically secure encryption algorithm and computes an authentication tag for the message.

Figure 5:
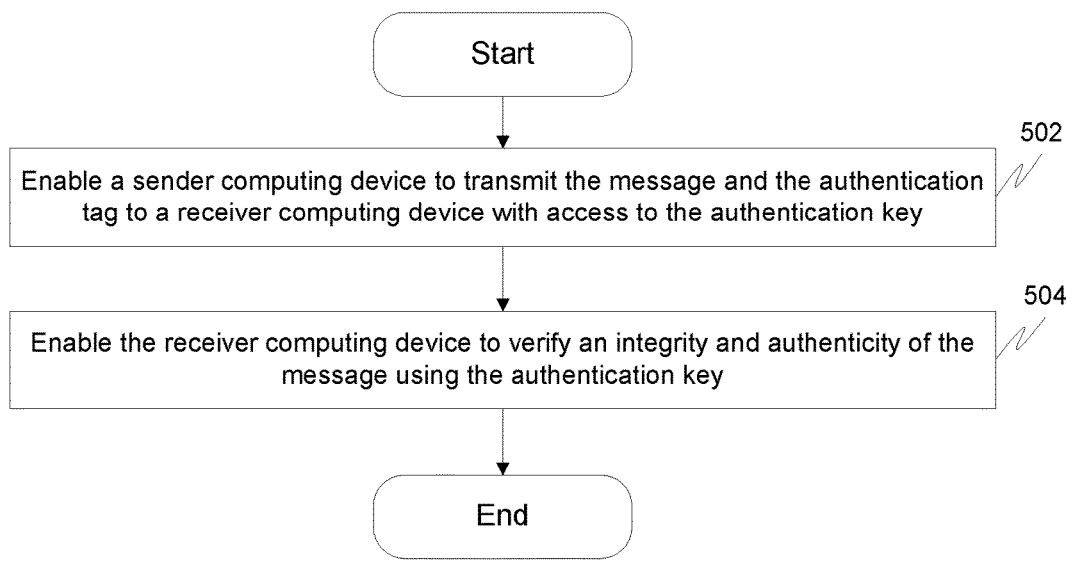
FIG. 5 illustrates a flowchart of a method for transmitting the message authenticated using the MAC from the sender computing device to a receiver computing device in accordance with an embodiment of the invention.

FIG. 5 illustrates a flowchart of a method for transmitting the message authenticated using the MAC from sender computing device 102 to receiver computing device 104 in accordance with an embodiment of the invention.

At step 502, sender computing device 102 transmits the message and the authentication tag corresponding to the message to receiver computing device 104. Receiver computing device 104 is already provided with an access to the authentication key that was used for encrypting the message. Thereafter, at step 504, receiver computing device 104 verifies the integrity and authenticity of the message using verification module 118 by utilizing the authentication key. Step 504 is further described in detail in conjunction with FIG. 6.

Figure 6:
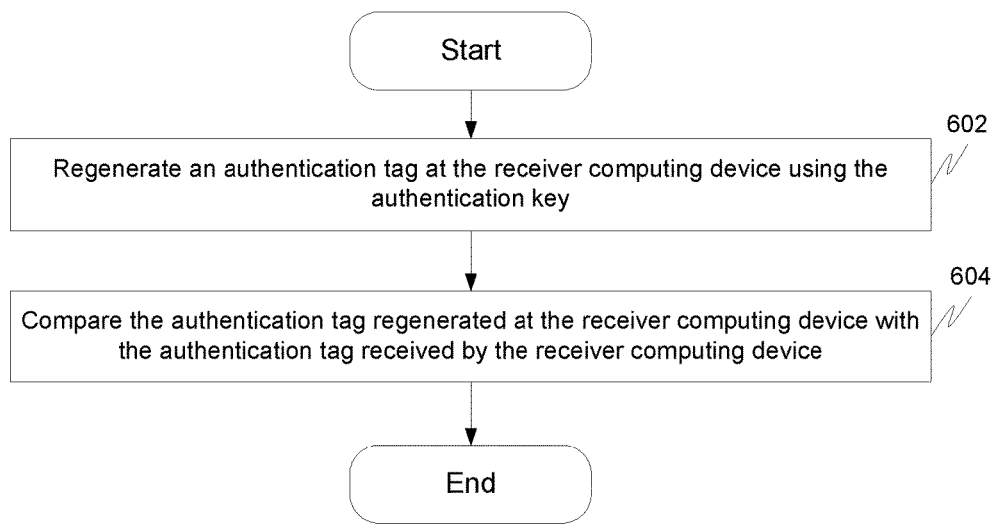
FIG. 6 illustrates a flowchart of a method for verifying the integrity and authenticity of the message at the receiver computing device in accordance with an embodiment of the invention.

FIG. 6 illustrates a flowchart of a method for verifying the integrity and authenticity of the message at receiver computing device 104 using verification module 118 in accordance with an embodiment of the invention.

At step 602, receiver computing device 104, on receiving the message and the authentication tag of the message from sender computing device 102, regenerates an authentication tag using the authentication key using regeneration module 302 embedded within verification module 118. Once the authentication tag is regenerated, at step 604, comparison module 304 embedded within verification module 118 compares the authentication tag regenerated by regeneration module 302 with the authentication tag received from sender computing device 102 in order to verify the integrity and authenticity of the message transmitted from sender computing device 102. If the authentication tag that was regenerated by regeneration module 302 matches with the authentication tag transmitted from sender computing device 102, the integrity and authenticity of the message is determined to by verified.

An embodiment of the present invention may relate to a computer program product with a non-transitory computer readable storage medium having computer code thereon for performing various computer-implemented operations of the method and/or system disclosed herein. The media and computer code may be those specially designed and constructed for the purposes of the method and/or system disclosed herein, or they may be of the kind well known and available to those having skill in the computer software arts. Examples of computer-readable media include, but are not limited to, magnetic media, optical media, magneto-optical media and hardware devices that are specially configured to store and execute program code. Examples of computer code include machine code, such as produced by a compiler, and files containing higher-level code that are executed by a computer using an interpreter. For example, an embodiment of the present invention may be implemented using JAVA®, C++, or other object-oriented programming language and development tools. Aspects of the present invention may also be implemented using Hypertext Transport Protocol (HTTP), Procedural Scripting Languages and the like.

The present invention reduces any arbitrary long message to its fixed size residue and only multiplies the fixed-size residue of the message with a short authentication key, while maintaining the integrity of the entire message including the dropped quotient part. Mathematically, this implies that the non-residue part of the message goes unauthenticated since the part of the message that is congruent to the modulus does not contribute to the value of the MAC. Thus, instead of relying solely on the secrecy of the key, the invention adds another layer of uncertainty while generating the MAC by hiding the prime modulus that is used to compress the message.

Therefore, by making the reduction modulo an unknown value, the MAC is actually a function of the entire message. That is, as long as the secrecy of the modulus is preserved, it is sufficient to multiply only the residue of the message with the authentication key to produce a secure MAC.

Also, maintaining secrecy of the prime modulus in the invention does not impose any extra overhead on the security algorithms as the same cryptographic function that is already being used protect the hashing key from exposure will also protect the secret modulus from exposure.

Further, multiplying only the residue of the message by the authentication key can be O (1+log k log log k) faster than multiplying all message blocks individually, where k is the security parameter. The invention also provides a significant reduction in the key size eliminating all bottlenecks of managing long keys in universal hashing approaches.

Additionally, the invention generates a predetermined size of the hashed image that is independent of the message length. This allow the hashed image to be subjected to faster processing by cryptographic functions.

Those skilled in the art will realize that the above recognized advantages and other advantages described herein are merely exemplary and are not meant to be a complete rendering of all of the advantages of the various embodiments of the invention.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention. The computing device includes a processor, a memory, a nonvolatile data storage, a display, and a user interface.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for generating a message authentication code (MAC) for authenticating a message, the method comprising:
   compressing the message through a compression module to generate a fixed-size residue of the message, wherein the fixed-size residue of the message is computed from the message modulo a divisor;
   multiplying the fixed-size residue of the message through an authentication module by an authentication key; and
   computing an authentication tag for the message through the authentication module by encrypting the fixed-size residue of the message utilizing a semantically secure encryption algorithm.

2. The method according to claim 1, wherein compressing the message comprises appending '1' as the most significant bit to the message.

3. The method according to claim 1, wherein the divisor is one of a prime integer and an irreducible polynomial.

4. The method according to claim 1, wherein the secure encryption algorithm is an IND-CPA secure encryption.

5. The method according to claim 1 further comprises:
   enabling a sender computing device to transmit the message and the authentication tag to a receiver computing device with access to the authentication key; and
   enabling the receiver computing device to verify an integrity and authenticity of the message using the authentication key.

6. The method according to claim 5, wherein the verifying an integrity and authenticity of the message comprises:
   regenerating an authentication tag at the receiver computing device using the authentication key; and
   comparing the authentication tag regenerated at the receiver computing device with the authentication tag received by the receiver computing device.

7. A system for generating a message authentication code (MAC) for authenticating a
   message, the system comprising:
      a memory;
      a processor communicatively coupled to the memory, wherein the processor is configured to:
         compress the message to generate a fixed-size residue of the message, wherein the fixed-size residue of the message is computed from the message modulo a divisor;
         multiply the fixed-size residue of the message by an authentication key; and
         compute an authentication tag for the message by encrypting the fixed-size residue of the message utilizing a secure encryption algorithm.

8. The system according to claim 7, wherein the processor is further configured to compress the message by appending '1' as the most significant bit to the message.

9. The system according to claim 7, wherein the processor is further configured to:
   enable a sender computing device to transmit the message and the authentication tag to a receiver computing device with access to the authentication key; and
   enable the receiver computing device to verify an integrity and authenticity of the message using the authentication key.

10. The system according to claim 9, wherein the processor is configured to verify the integrity and authenticity of the message by:
    regenerating an authentication tag at the receiver computing device using the authentication key; and
    comparing the authentication tag regenerated at the receiver computing device with the authentication tag received by the receiver computing device.

11. A computer program product for generating a message authentication code (MAC) for authenticating a message, the computer program product comprising a non-transitory computer readable storage medium having program instructions stored therein, the program instructions readable/executable by a processor to cause the processor to:
    compress the message to generate a fixed-size residue of the message, wherein the fixed-size residue of the message is computed from the message modulo a divisor;
    multiply the fixed-size residue of the message by an authentication key; and compute an authentication tag for the message by encrypting the fixed-size residue of the message utilizing a secure encryption algorithm.

12. The computer program product according to claim 11, wherein the program instructions further cause the processor to compress the message by appending '1' as the most significant bit to the message.

13. The computer program product according to claim 11, wherein the program instructions further cause the processor to:
    enable a sender computing device to transmit the message and the authentication tag to a receiver computing device with access to the authentication key; and
    enable the receiver computing device to verify an integrity and authenticity of the message using the authentication key.

14. The computer program product according to claim 13, wherein the program instructions cause the processor to verify the integrity and authenticity of the message by:
    regenerating an authentication tag at the receiver computing device using the authentication key; and
    comparing the authentication tag regenerated at the receiver computing device with the authentication tag received by the receiver computing device.

* * * * *